United States Patent [19]

Herman

[11] Patent Number: 4,937,554
[45] Date of Patent: Jun. 26, 1990

[54] ELECTRONIC BRAKE MONITORING SYSTEM AND METHOD

[75] Inventor: Mark N. Herman, Fremont, Calif.

[73] Assignee: Paccar Inc., Bellevue, Wash.

[21] Appl. No.: 355,687

[22] Filed: May 22, 1989

[51] Int. Cl.$^5$ ............................................. B60Q 1/00
[52] U.S. Cl. .................................... 340/453; 188/1.11
[58] Field of Search .......................... 73/121, 129, 132; 116/28 R; 188/1.11, ; 340/453, 454

[56] References Cited

U.S. PATENT DOCUMENTS

| | | | |
|---|---|---|---|
| 1,690,121 | 11/1928 | Klimek | 73/121 |
| 2,124,960 | 7/1938 | Waring et al. | 73/129 |
| 3,356,188 | 12/1967 | Goldman et al. | 188/1.11 |
| 4,800,991 | 1/1989 | Miller | 340/454 |

Primary Examiner—Robert Raevis
Attorney, Agent, or Firm—Flehr, Hohbach, Test, Albritton & Herbert

[57] ABSTRACT

A brake monitoring system for a motorized vehicle having fluid brakes including a pressurized fluid chamber and brake engaging apparatus. Sensors are provided to measure the required fluid pressure exerted by the fluid chamber on the engaging apparatus to bring about braking of the vehicle. Measurement is also made of the distance the engaging apparatus is extended from the fluid chamber in braking. Apparatus is further provided to determine from the measured fluid pressure and measured engaging distance whether the brakes are properly adjusted.

15 Claims, 9 Drawing Sheets

Y = YELLOW WARNING LIGHT ⟶ BRAKES NEED ADJUSTMENT

R = RED WARNING LIGHT ⟶ BRAKES ILLEGALLY MISADJUSTED

ELECTRONIC BRAKE MONITORING SYSTEM AND METHOD

BACKGROUND OF THE INVENTION

1. Field of the Invention

The present invention relates generally to a braking system for motorized vehicles having air brakes. More particularly the invention relates to electronically measuring air pressure and pushrod travel and determining from these two measurements whether the brakes are adjusted.

2. Description of the Related Art

Large trucks and tractor-trailers are becoming increasingly more common on our roadways. As a result, the safe operation of these vehicle has become a matter of increased concern. Of the accidents which are caused by mechanical failure, the greatest problem is improperly adjusted brakes.

Trucks and tractor-trailers operate on an air brake system. In an emergency situation the brakes must be properly adjusted. Most states have laws requiring trucks to demonstrate that their brakes are properly adjusted at an application pressure of up to 100 pounds of pressure per square inch (p.s.i.).

Referring to FIG. 1, truck brakes operate when an air chamber having air pressure applied to it pushes out a pushrod 14 which presses against a slack adjuster 22. The slack adjuster turns the camshaft 24 which causes the brake shoes 33-34 of FIG. 3 to be pushed against the brake drum 35, braking the vehicle. The pushrod 14 is extended from the air chamber 10 at low pressure until the brake shoes contact the brake drum surface. The pressure builds as the brake shoes are compressed against the brake drum. The slack adjuster, cam shaft and brake shoes have a certain amount of give to them. The process of taking up the give, and compressing the brake shoes against the drum is the windup.

The pushrod 14 has a maximum extension of about three inches. As the brake shoes wear down the amount of travel in the pushrod before the brake shoes contact the drum increases. Eventually it will reach a point where after the brake shoes have contacted the drum there is not enough extension left in the pushrod 14 to windup the brake up to the required braking force. Therefore, if a truck needs to brake in an emergency situation it is unable to do so because its brakes are so far out of adjustment the required braking pressure cannot be reached.

The term adjustment refers to the distance between brake drum and brake shoes. If the shoes are as close as they can be to the drum without contacting it the brakes are properly adjusted. As the brake shoes wear and the gap between them and the drum increases the brakes fall out of adjustment. Optimally, pushrod extension will cause immediate contact between the brake shoes and the drum. The remaining extension should then increase the pressure at which the shoes are compressed against the drum. As the brakes fall out of adjustment, some of the pushrod extension is used just to make contact between the shoes and the drum.

The prior art has come out with two devices which measure when the pushrod is extended too far out. The problem with these two devices, as will be seen, is that they measure the position of the pushrod which, in most instances, would only be reached in an emergency situation. While this measurement may be used to trigger a "brakes out of adjustment" warning signal, such an occurrence would be too late.

Referring to FIG. 1, one prior art system includes a sensor 42 which is set at a specified distance from the air chamber 10 along the pushrod's path of extension. A magnetic strip 40 is placed on the pushrod 14. When the pushrod 14 extends a specified distance, for example two inches, the magnetic strip 40 is positioned directly over the sensor 42 activating the sensor. The sensor unit sends a signal which could be displayed on the truck dashboard to flag the driver.

The second prior art method operates on the same principle. It has a built in indicator, set at two inches which clips out and is exposed when the pushrod reaches that length. The indicator is an orange band on the pushrod. During operation the orange band is not visible (it is inside the pushrod housing chamber). When the stroke reaches two inches the pushrod protrudes enough to expose the orange band which clips out and remains exposed.

Under normal braking conditions a truck uses about 30 or 40 p.s.i. of air pressure to stop. If the pushrod extends to 1.75 inches and is continually applying 30 or 40 p.s.i. neither of the above indicators will issue a "brakes out of adjustment" warning. In that case when an emergency stop is attempted and the 100 p.s.i. pressure is applied, the pushrod only has an inch or so to windup to the required braking force. Chances are significant that it will be unable to do this, prohibiting the truck from braking safely. Additionally, although the indicators would have been activated as the pushrod went through the two inch mark it would have been too late because the truck would have already been in an emergency situation.

This is, perhaps, clearer when reference is made to FIG. 6. Line C, which represent out of adjustment, travels to the right at low pressure initially. This is representative of the movement of the pushrod as it moves the brake shoes into contact with the brake drum. Once contact is made, at point C1, the pressure builds as the brake shoes are compressed against the drum with increasing force. Unfortunately, the pushrod had already extended too far before contact was made. Note specifically that line C reaches its full three inch extent before it ever reaches 100 p.s.i. Therefore, the brake will never be able to reach the required braking force, to stop in an emergency, and required by state law for inspection.

Conversely, at line A, the brakes are adjusted and pushrod extension causes the brake shoes to contact the brake drum almost instantaneously. The brake shoes can then be compressed against the brake drum with the requisite braking force within the two inches of travel of the pushrod.

Referring to line C again, if the prior art device is set at 2 or 2¼ inches and the truck has only had reason to brake under normal conditions (about 30 to 40 p.s.i.), a brake out of adjustment signal will never be given when, in fact, the brakes are already out of adjustment. When 100 p.s.i. is attempted it will fail. Although this failed attempt may trigger the prior art device by pushing the pushrod past 2 or 2¼ inches, it will be too late because the truck will not be able to obtain the necessary braking pressure.

SUMMARY OF THE INVENTION

Accordingly, it is the object of the present invention to provide a brake monitoring system which measures air pressure in addition to pushrod travel distance and produces a signal based on both of these two signals when the brakes are out of adjustment.

It is another object of the present invention to continually provide a truck or tractor-trailer driver with an indication of the adjustment status of each brake.

The attainment of these and related objects may be achieved through use of the novel electronic brake monitoring system herein disclosed. The electronic brake monitoring system in accordance with this invention is for motorized vehicles having fluid brakes which include a pressurized fluid chamber having an engaging means which exerts pressure on a braking member that is connected to the engaging means, whereby the brake shoes of the braking member are placed in contact with a brake drum causing the motorized vehicle to brake.

The invention further comprised a means for sensing the fluid pressure exerted by the fluid chamber on the engaging means causing the engaging means to be extended toward the braking member. Also provided is a means for measuring the distance the engaging member is extended from the fluid chamber toward the braking member. Lastly, a determination is made from the sensed fluid pressure and measured engaging means distance whether the brakes are out of adjustment at any given fluid pressure and engaging means distance.

DETAILED DESCRIPTION OF THE PREFERRED EMBODIMENT

Figure 1:
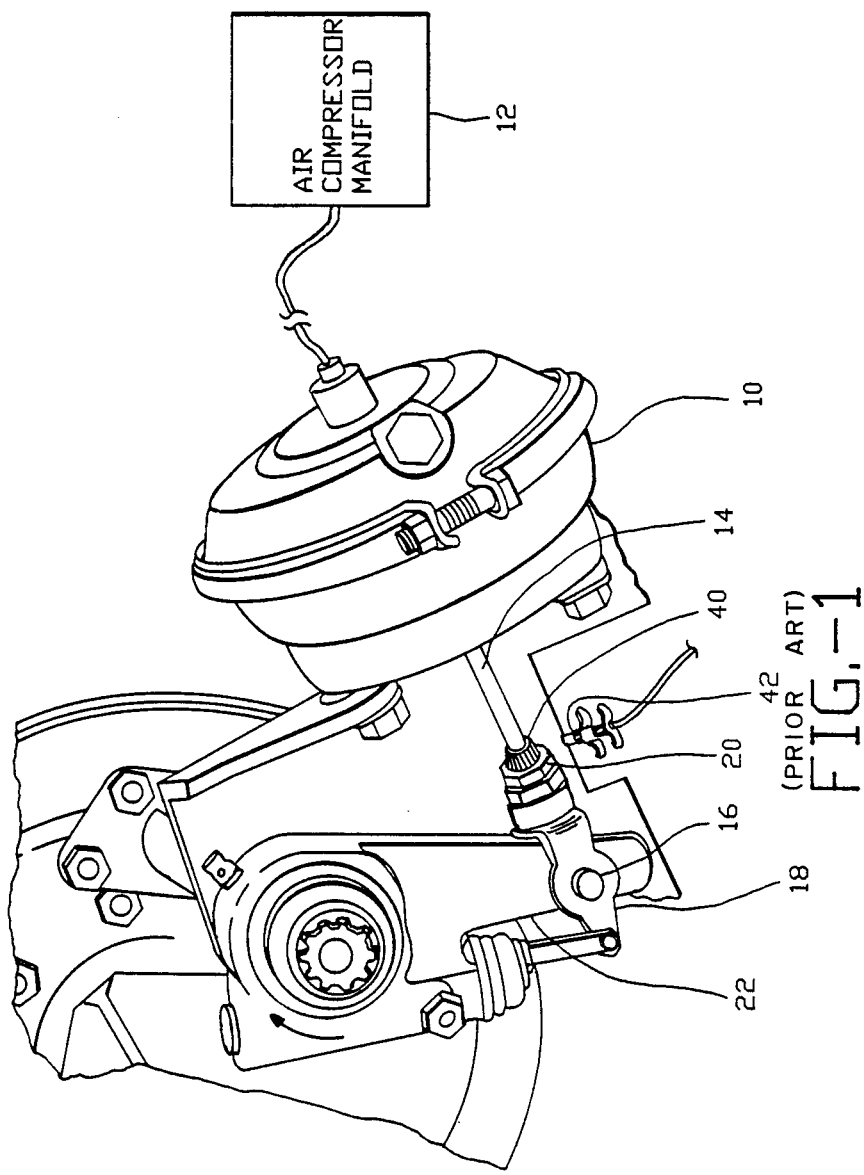
FIG. 1 is a perspective view of a prior art device mounted to an air brake system.
Figure 2:
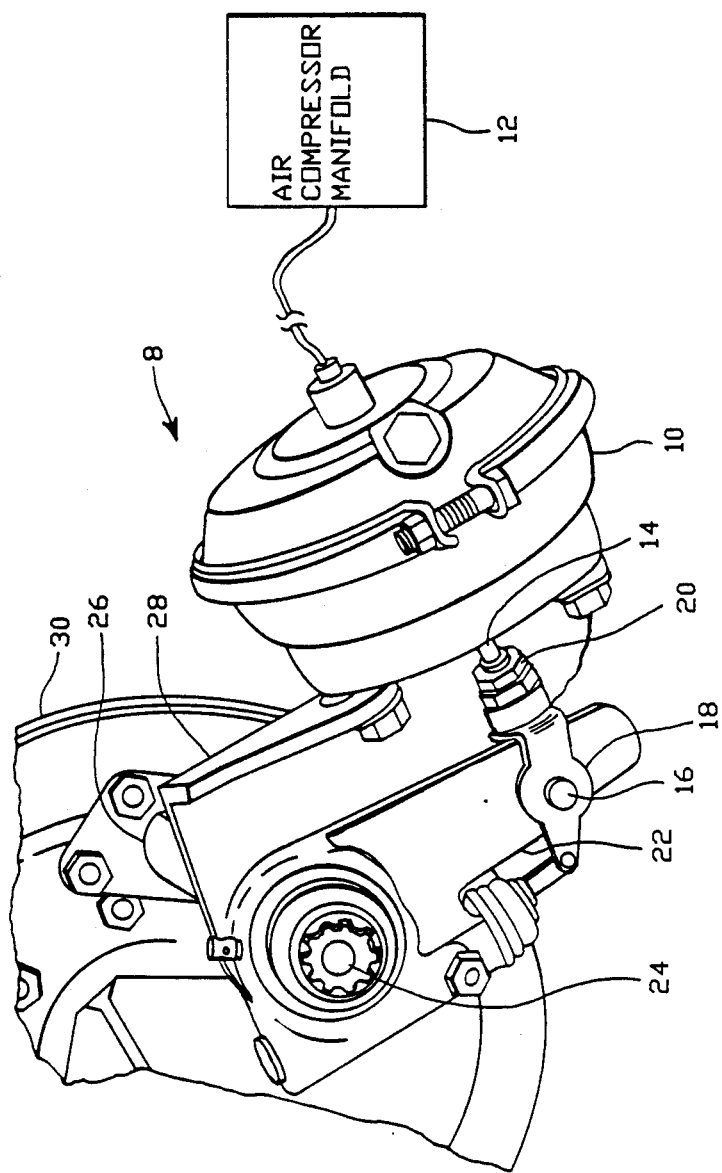
FIG. 2 is a perspective view of a truck or tractor-trailer air brake system when the brakes are not being applied.

Referring to FIG. 2, a standard truck or tractor-trailer air brake system is shown. An air brake manifold 12 acts as a distribution center for air pressure. In an average truck or tractor-trailer there are two braking systems per axle, i.e., one air brake system per set of wheels. The air compressor manifold 12 supplies air pressure to all of the air brake systems.

Figure 5:
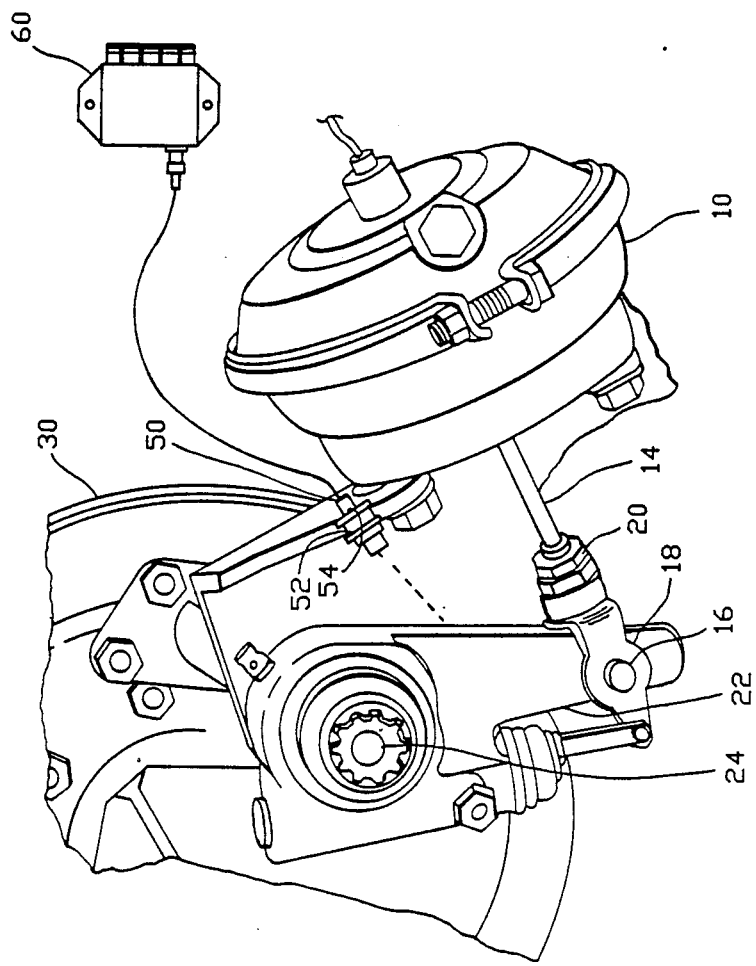
FIG. 5 is a perspective view of a truck or tractor-trailer air brake system, when the brakes are being applied, with the pushrod distance sensor of the preferred embodiment mounted thereto.

FIG. 2 focuses on one of these air brake systems. An output from the manifold 12 is fed to the air chamber 10. The air chamber 10 houses pushrod 14, only the tip of which is shown because the remainder is internal to the air chamber 10 (when the brakes are not being applied). The pushrod 14 is extended from the air chamber 10 as the brakes are applied. The extension of the pushrod from the air chamber 10 is illustrated in FIG. 5.

The pushrod 14 is connected to a slack adjuster 22. A pushrod nut 20 secures the clevis bracket 18 to the pushrod 14. The clevis bracket 18 is connected to the slack adjuster 22 at the clevis pin 16. As the brakes are applied, the pushrod 14 is forced out of the air chamber 10. (See FIG. 4). This movement turns the slack adjuster 22 on the camshaft 24. As the camshaft 24 is turned due to the extension of the pushrod 14, it activates the braking mechanism 30.

The braking mechanism 30 is composed primarily of brakes shoes and brake drum and a S-CAM which supports the shoes and moves them into contact with the drum. The brake shoes-brake drum contact being the friction which brakes the vehicle.

Figure 3:
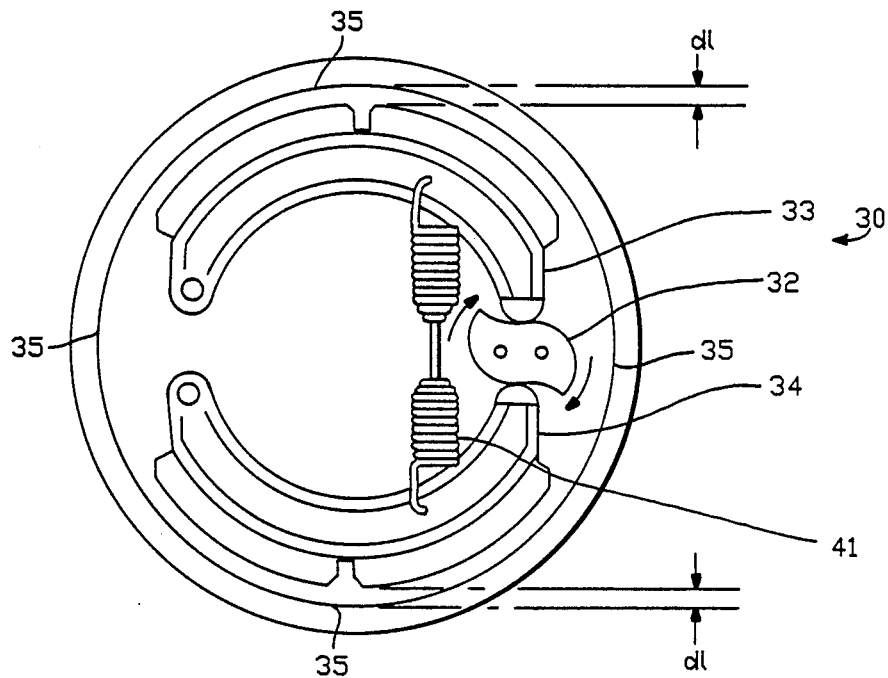
FIG. 3 is a diagrammatic illustration of the braking mechanism of the preferred embodiment.

Referring to FIG. 3, the braking mechanism 30 is shown in more detail. The camshaft 24 is connected to S-CAM 32. As the pushrod 14 extends, turning the camshaft 24, the S-CAM 32 is similarly turned. Due to its "S" like configuration, the S-CAM 32 causes two shoes 33 and 34 to be forced outward toward the brake drum 35. The brake shoes 33-34 contact the brake drum 35 as the S-CAM 32 is turned (as a result of the truck or tractor-trailer brakes being applied).

The distance d1 represents the distance the brake shoes 33-34 are from the brake drum 35. This distance is relatively small when the brakes are in adjustment. In that case the shoes 33-34 quickly contact the drum 35 allowing pressure to build along their contact. As the shoes 33-34 wear down the distance they must travel before contact with the drum 35 is increased. Thus, the S-CAM 32 must turn more, meaning the push rod 14 must extend more. In optimum adjustment, the shoes 33-34 are as close as they can be to the drum 35 without actual contact. A spring 41 is provided to pull the shoes 33-34 away from the drum when the brakes (or braking mechanism 30) is not applied.

Figure 4:
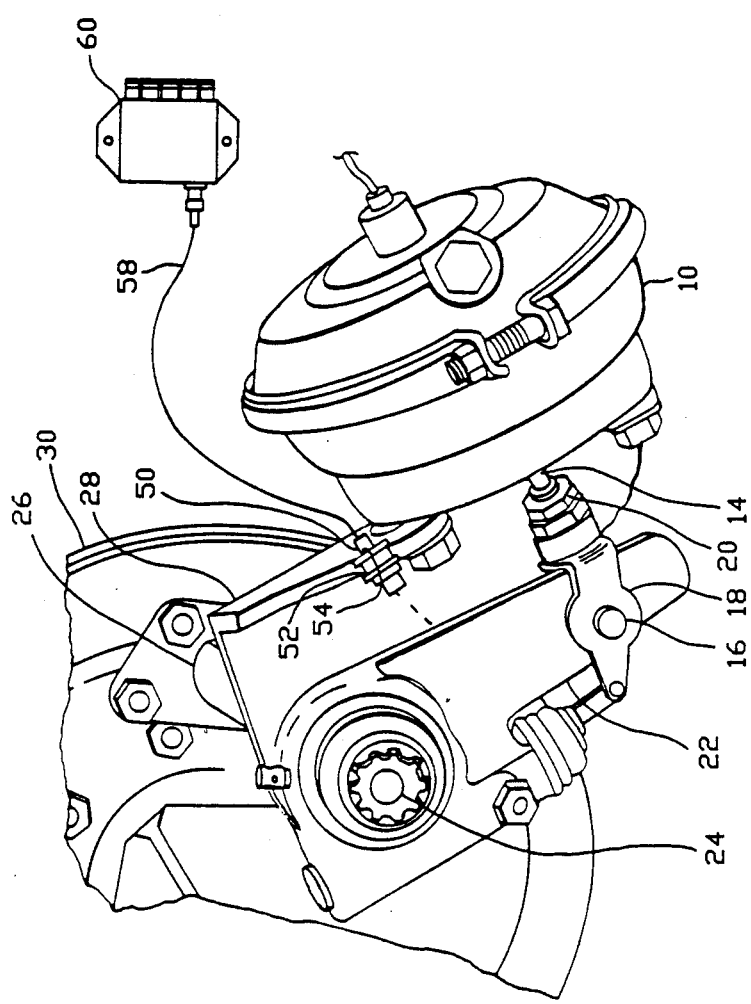
FIG. 4 is a perspective view of a truck or tractor-trailer air brake system, when the brakes are not being applied, with the pushrod distance sensor of the preferred embodiment mounted thereto.

Referring to FIG. 4, the brake system of FIG. 2 is shown with the addition of the pushrod distance sensor 50 of the preferred embodiment. The sensor 50 is a traditional Colpitts oscillator type where the sensor is the resonating coil for the oscillator. The proximity of the target "pulls" the oscillator which changes its frequency and amplitude of modulation. The amplitude is half-wave rectified and filtered to obtain an analog voltage proportional to target position.

The pushrod sensor 50 is mounted to the air chamber mounting bracket 28. It has a first and second mounting nut 52 and 54. The sensor 50 is focused on the slack adjuster 22. A cable 58 connects the sensor 50 to the distance sensor electronics unit 60. The electronic unit 60 produces an analog voltage proportional to the distance between the slack adjuster 22 and the sensor 50. This analog signal is output to the system microprocessor 80 (FIG. 7) where it is tabulated along with the air pressure concurrently being applied to the air chamber 10.

Referring to FIG. 5, an air brake is shown with the pushrod 14 being in the extended position. The extended position occurs as a result of the brakes being applied and air from the air chamber 10 forcing the pushrod 14 out toward the slack adjuster 22. The pushrod 14 pushes the slack adjuster 22 which turns the camshaft 24 which in turn activates the braking mechanism 30.

The distance sensor 50 is shown focused on the slack adjuster 22. The sensor 50 measures the distance between it and the slack adjuster 22. The electronic unit 60 then creates an analog signal proportional to the distance the slack adjuster 22 is from the sensor 50. This analog signal is output to the microprocessor 80 of FIG. 7. Through this combination of sensor 50, electronic unit 60 and microprocessor 80, the distance the pushrod 14 is extended from the air chamber 10 is continually measured.

Figure 6:
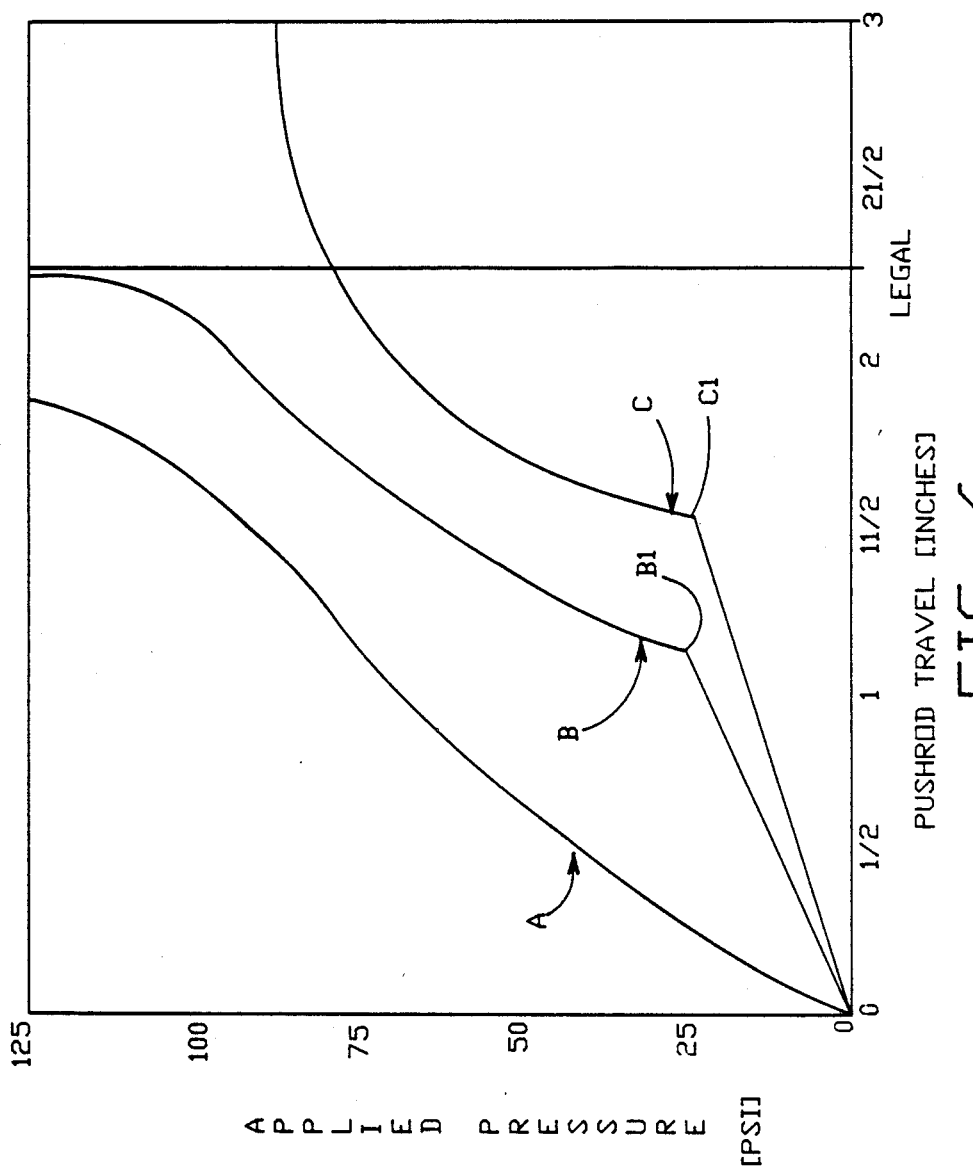
FIG. 6 is a graph which plots the adjustment status of an air brake as a function of air pressure verses pushrod travel distance.

Referring now to FIG. 6, a plot of air pressure verses pushrod extension (or travel, as it is often referred to) and its indication of brake adjustment is shown. To understand the plot it is necessary to understand the principle underlying the operation of air brakes on trucks or tractor-trailers. The actual braking of a truck or tractor-trailer occurs when the brake shoes contact the brake drum. As the brakes are applied over a period of time the brakes shoes begin to wear down. When this occurs the initial distance between the brake shoes and the brake drum increases. Since the pushrod 14 extending from the air chamber 10 forces the brake shoes into contact with the brake drum, as the brake shoes-brake drum distance increases so does the distance the pushrod must extend before the brake shoes contact the brake drum. This phenomenon is illustrated in FIG. 6.

The vertical axis is representative of air pressure being applied through the air chamber 10 and to the pushrod 14. It ranges from zero when the brakes are not being applied to 100 p.s.i. when the brake pedal is floored. The horizontal axis is pushrod distance. It ranges from zero to three inches, the maximum pushrod extension of the air chamber 10 of the preferred embodiment. Three uninterrupted lines A, B and C are shown. Line A represents when the brakes are in proper adjustment. Line B represents when there is a small amount of slack causing the brakes to be slightly out of adjustment. Line C represents when the brakes are dangerously out of adjustment and a violation of brake adjustment laws.

Line A shows the optimum condition. When the pushrod 14 is moved out of the air chamber 10 the brake shoes immediately contact the brake drum and pressure starts to build. The pushrod will travel a distance of about 2 inches for an applied pressure of 100 p.s.i.. This distance results from a certain amount of give in the multiple components of the braking mechanism and the compressability of the brake shoes themselves.

Line B demonstrates a slight amount of slack built up between the brake shoes and the brake drum (i.e., the brake shoes have been worn slightly). Here, the pushrod 14 extends a distance of a little over an inch at low pressure before the brake shoes come in contact with the brake drum. The reason the pushrod 14 extends at low pressure is because the brake shoes have not yet contacted the brake drum yet, thus the brake shoes are only being pushed through air and the pushrod 14 is only supporting the bare weight of the braking components. At point B1 the brake shoes contact the brake drum and the pressure exerted on the pushrod 14 increases as the brake shoes are compressed against the brake drum. Since the pushrod 14 has to extend further in line B than line A before contact is made between the brake shoes and drum, the pushrod 14 will extend further for an applied pressure of 100 p.s.i..

Referring to Line C, when a brake is out of adjustment the shoes are so far from the brake drum that when the pushrod 14 is extended to its maximum distance it is incapable of exerting the required braking force. Initially the distance between the brake shoes and drum is such that the pushrod 14 extends over an inch and a half at low pressure before contact between the brake shoes and drum is made. This contact occurs at point C1. From that point the pushrod is extended further increasing the pressure applied to the braking mechanism 30. Unfortunately, at the maximum extension of the pushrod 14 the brake is unable to deliver the pressure required to stop a truck or tractor-trailer in emergency situations or to meet braking safety standards.

Therefore, when corresponding measurements of air pressure and pushrod distance are located to the right of the line B the preferred embodiment issues a brake "out of adjustment" warning to the driver. When the corresponding measurements are near, but still to the left of line B the preferred embodiment issues a caution that the brakes are getting close to being out of adjustment. When the corresponding measurements are well to the left of line B either no signal is issued or a brakes are adjusted signal is issued. The mechanisms which process and output the respective signal are described in detail below.

Figure 7:
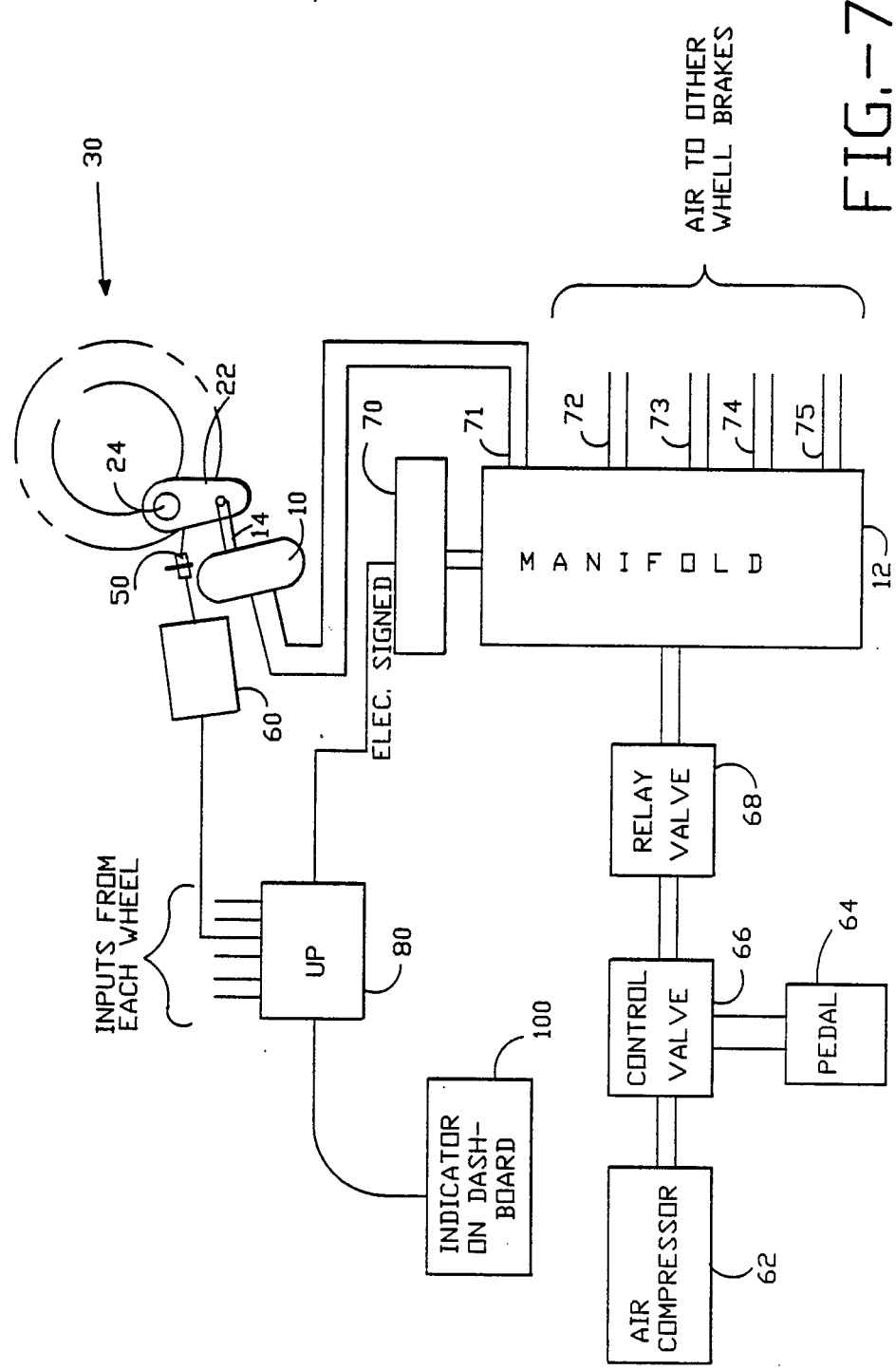
FIG. 7 is a schematic view of the electronic air brake system of the preferred embodiment.

Referring to FIG. 7, a schematic block diagram of the preferred embodiment installed in a truck or tractor-trailer brake system is presented. On board every tractor-trailer is an air compressor 62. The air compressor is used to supply pressure to the brakes in addition to having many other uses, i.e., power windows, locks, etc. The air compressor 62 is capable of supplying 0-120 p.s.i. of air pressure. In the braking system, the brake pedal 64 actuates a control valve 66 which controls the amount of air pressure passed along to the brake mechanism 30. The control valve 66 passes a small amount of pressure when the pedal is slightly depressed and increasingly more as the pedal is further depressed.

The relay valve 68 is connected to the control valve output and it maintains a sufficient volume of air flow at the desired pressure. The relay valve 68 is connected to the brake manifold 12. The manifold 12 has a plurality of outputs. These outputs go to all the braking units and, as mentioned previously, there are two braking units per axle. For example, the two rear axles on a tractor have four wheels, two on each side. However, there are only two braking systems each braking one pair of wheels.

An air pressure transducer 70 is also connected to the output of the manifold 12. The output to which the transducer 70 is attached receives the same air pressure as all the other manifold outputs 71-75. Therefore, to monitor it is to monitor the air pressure applied to the air chamber 10 and the pushrod 14. The transducer 70 converts the air pressure received by its sensor into an analog voltage signal. The analog signal is proportional to the amount of air pressure. Transducers capable of performing this function are well known in the art. A suitable transducer is the 411 Series Pressure Sender made by Stewart-Warner Corporation of Chicago, Ill.

The analog signal output by the pressure transducer 70 is fed to the controller 80. Similarly the analog output signal of the distance sensor 50 is output by the electronic unit 60 to the controller 80. Since the same pressure is delivered to each wheel (although the volume may vary—the rear wheels do more of the braking) there need be only one pressure transducer 70. However, since there are a plurality of braking mechanisms 30 there are a plurality of pushrod distance sensors 50.

Figure 8:
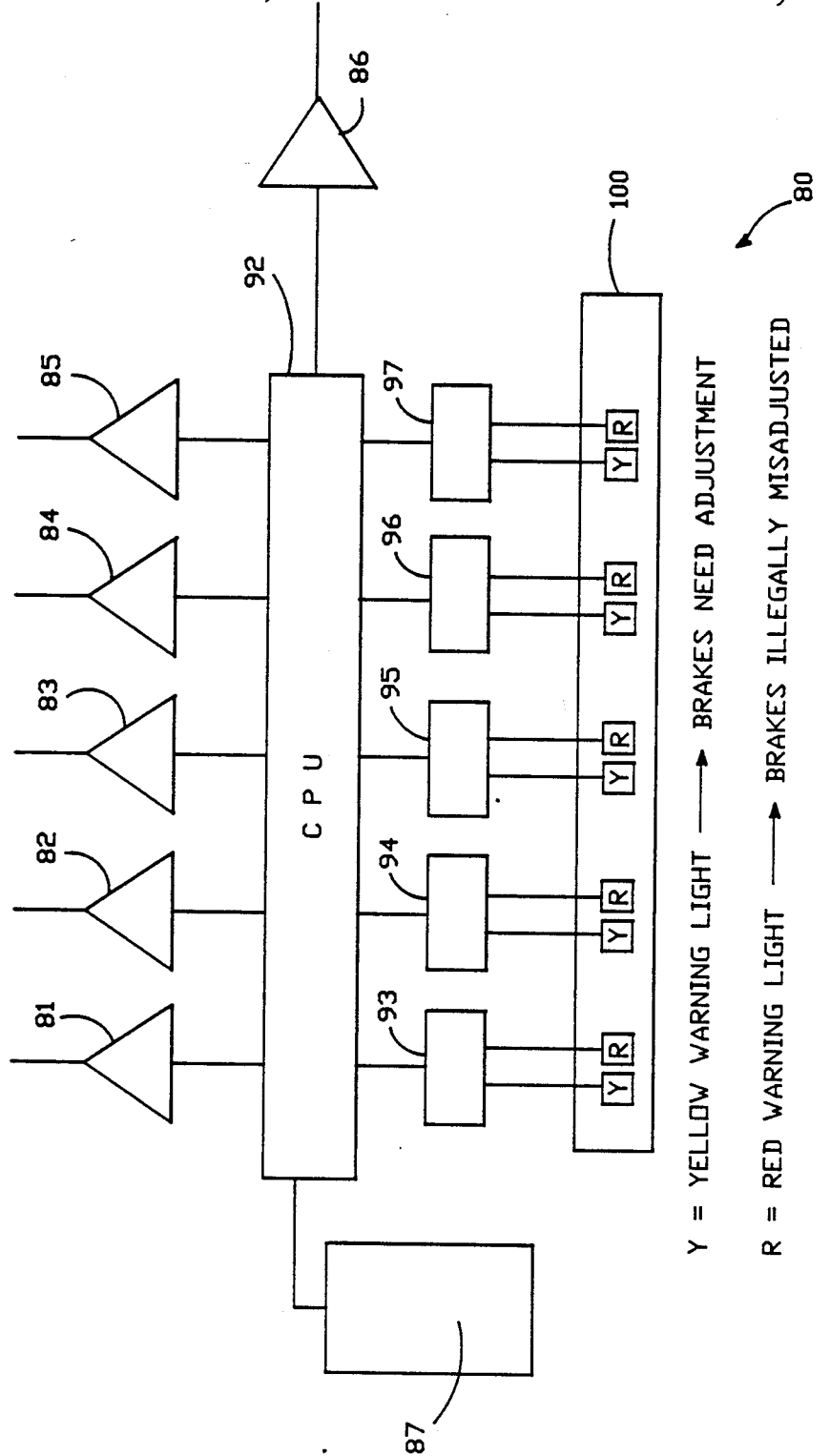
FIG. 8 is a diagrammatic illustration of the electronics of the preferred embodiment.

Referring to FIG. 8, one possible configuration of the controller 80 is shown. In one possible configuration of an actual tractor-trailer application there would be ten

(10) analog pushrod travel distance signals. Two from each of the five axles, one axle in front of the tractor, two at the rear, and two at the rear of the trailer. FIG. 8 is shown only for purposes of illustration and the preferred embodiment is not limited to this configuration. Many other configurations could also be used.

The analog pushrod travel distance signals input from electronic units (60 of FIG. 7) are connected to analog-to-digital converters 81–85. Similarly, the analog air pressure signal is converted to digital from analog by converter 86. These digital equivalent signals, from both the pushrod distance sensor 50 and the air pressure sensor 70 are used by the Central Processing Unit (CPU) 92 to address locations in a look-up tables 87. The look-up table 87 is mapped out to replicate the plot of FIG. 6. Thus, for the braking mechanism 30 of one wheel, for example the input to converter 83, the pushrod signal causes the CPU 92 to address a location on a horizontal axis of the look-up table 87. The digital air pressure signal from converter 86 causes the CPU 92 to address a location on a vertical axis of the look-up table 87.

These two address locations will define a point on the look-up table 87 which will correspond to a location on the plot of FIG. 6, since the look-up table 87 is a replica of the FIG. 6 plot. If the defined point is well to the left of line B a proper adjustment signal will be output by the CPU 92. If the defined point is near the line B a caution brakes close to being out of adjustment signal is output by the CPU 92. If the defined point is located to the right of the line B an out of adjustment warning signal is output by the CPU 92. The output of the CPU 92 for the wheel whose distance sensor is input to converter 83 is sent through an output buffer 95 to a display unit 100 on the dashboard of the truck or tractor-trailer. The display unit or indicator 100 alerts the driver of the truck or tractor-trailer as to the condition of his brakes.

Other wheel pushrod distance sensors output a signal to converters 81 and 82. The CPU 92 output for these wheels is sent through output buffers 93 and 94, respectively. Similarly, for the braking mechanisms whose pushrod distance sensors output to converters 84 and 85, the CPU 92 output is sent through output buffers 96 and 97, respectively.

The CPU 92 provides uniform sequential timing to all components of the controller 80. The CPU 92 also uses the look-up table comparisons for each set of pushrod travel distance and air pressure measurements to determine the brake adjustment. A more detailed understanding of how the controller 80 works may be gained by the analysis of the flow chart which follows.

Figure 9:
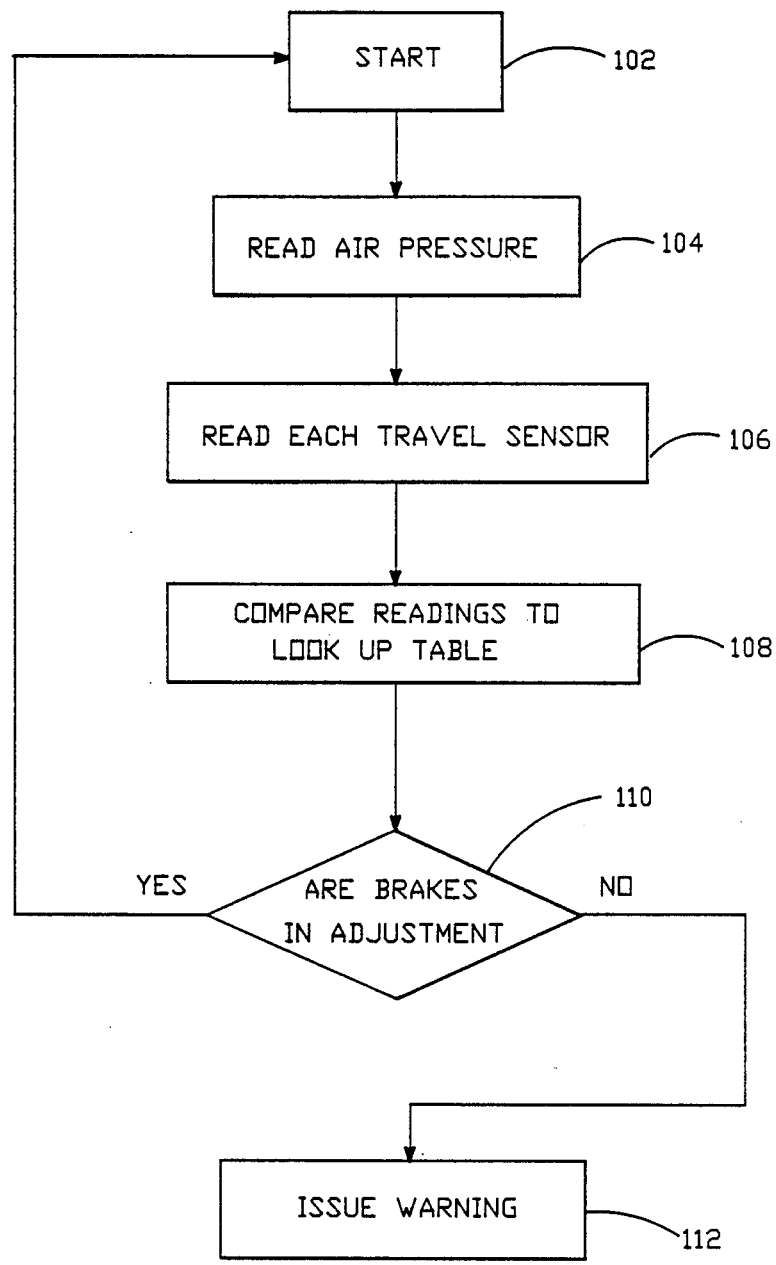
FIG. 9 is a flow chart of the operation of the microprocessor of the preferred embodiment.

Referring to FIG. 9, a flow chart for operation of the microprocessor 80 is provided. The start block 102, is initiated by turning the truck ignition key into the "on" position. During the start block the microprocessor 80 initializes the pushrod distance at zero when measured air pressure is zero. At step 104, the microprocessor 80 reads the air pressure sensor 70. Next, at step 106, the pushrod travel distance for each brake is read. In step 108, the values read in steps 104 and 106 are compared to the look-up table 87 which resembles the plot of FIG. 6. In step 110, for each comparison in step 108, the question is asked, are the brakes adjusted? If they are not, a suitable warning is sent to the driver via an indicator 100 on the dashboard of the truck or tractor-trailer. If they are adjusted, the program returns to the start position 102 and begins the process all over again, repeating this loop continuously while the ignition is on.

Referring again to FIG. 7, the output of the controller 80 is output to an indicator 100 on the dashboard of the truck or tractor-trailer. The indicator 100 alerts the driver to the status of each brake individually by the illumination of a specific light for each wheel group, possibly laid out to match the wheel arrangement of a truck or tractor-trailer, or any other applicable method to indicate each brake.

It should further be apparent to those skilled in the art that various changes in form and details of the invention as shown and described may be made. It is intended that such changes be included within the spirit and scope of the claims appended hereto.

What is claimed is:

1. In a braking system for a motorized vehicle having at least one fluid brake including a brake engaging means and a pressurized fluid chamber exerting fluid pressure on said engaging means to cause the engaging means to extend forward upon actuation of a brake pedal in order to exert pressure on a braking means that is connected to the engaging means, the improvement comprising:

means for sensing the fluid pressure exerted by the fluid chamber on the engaging means in order to cause the engaging means to extend forward toward the braking means;

means for measuring the distance the engaging member is extended from the fluid chamber toward the braking means; and means for determining from said sensed fluid pressure and said measured engaging means distance the adjustment status of said fluid brake.

2. The braking system of claim 1 wherein the fluid pressure sensing means comprises a fluid pressure transducer which creates an electrical signal proportional to the amount of fluid pressure being supplied to the fluid chamber.

3. The braking system on claim 2 wherein the distance measuring means comprises an electromagnetic sensor for measuring the distance the engaging means has travelled by measuring the displacement in the braking means, said distance measuring means creating an electrical signal proportional to the distance the engaging means is extended from the fluid chamber.

4. The braking system of claim 3 wherein the determining means comprises a microprocessor having a table of corresponding fluid pressures and engaging means distances, said microprocessor determining from said table brake adjustment status based on a corresponding measurement of fluid pressure and engaging means distance.

5. A braking system for a motorized vehicle having at least one fluid brake including a pressurized fluid chamber which extends a pushrod that exerts pressure on a slack adjuster activating a braking means that is connected to the slack adjustor, comprising:

means for sensing the fluid pressure exerted by the fluid chamber on said pushrod causing said pushrod to be extended toward the slack adjuster;

means for measuring the distance the pushrod is extended from said fluid chamber toward said slack adjustor, moving said slack adjuster by a like amount; and means for determining from said sensed fluid pressure and measured pushrod distance whether said brake is out of adjustment.

6. The braking system of claim 5 wherein the fluid pressure sensing means comprises a fluid pressure transducer which creates an electrical signal proportional to the amount of fluid pressure being supplied to the fluid chamber.

7. The braking system on claim 6 wherein the distance measuring means comprises an electromagnetic sensor for measuring the distance the pushrod has travelled by measuring the displacement in the slack adjuster, said distance measuring means creating an electrical signal proportional to the distance the pushrod is extended from the fluid chamber.

8. The braking system of claim 7 wherein the determining means comprises a microprocessor.

9. The braking system of claim 7 wherein the determining means further comprises:
   means for converting the proportional electrical signals from the sensing means and the measuring means into digital signals;
   means for tabulating the digital fluid pressure signal along one axis of a table in increasing order;
   means for tabulating the digital pushrod distance along another axis of the table in increasing order; and
   means for determining for each corresponding measurement of fluid pressure and pushrod distance in the table whether the brake is adjusted.

10. The braking system of claim 5 wherein the fluid is air.

11. An electronic braking system for a motorized vehicle having air brakes, the air brakes including a pressurized air chamber having a pushrod which exerts pressure on a slack adjuster turning the slack adjuster which is connected to a braking member, whereby the braking member is placed in contact with a brake drum causing the motorized vehicle to brake, comprising:
   means for sensing the air pressure exerted by the air chamber on the pushrod to extend the pushrod;
   means for measuring the distance the pushrod is extended from the air chamber;
   means for tabulating said sensed air pressure and measured pushrod distance; and
   means for determining from said tabulation whether the air brakes are out of adjustment.

12. A method of braking for a motorized vehicle having at least one fluid brake including a pressurized fluid chamber having an engaging means which exerts pressure on a braking means that is connected to the engaging means, whereby brake shoes of the braking means are placed in contact with a brake drum causing the motorized vehicle to brake, comprising the steps of:
   sensing the fluid pressure exerted by the fluid chamber on the engaging means causing the engaging means to be extended toward the braking means;
   measuring the distance the engaging member is extended from the fluid chamber toward the braking means; and
   determining from said sensed fluid pressure and measured engaging means distance whether the brake is out of adjustment.

13. The method of braking of claim 12 wherein the step of fluid pressure sensing comprises the step of providing a fluid pressure transducer which creates an electrical signal proportional to the amount of fluid pressure being supplied to the fluid chamber.

14. The method of braking of claim 13 wherein the step of distance measuring comprises the step of providing an electromagnetic sensor for measuring the distance the engaging means has travelled, said distance measuring means creating an electrical signal proportional to the distance the engaging means is extended from the fluid chamber.

15. The method of braking of claim 14 wherein the step of determining comprises the steps of tabulating the fluid pressure signal and the engaging means distance signal and designating for each corresponding measurement of fluid pressure and engaging means distance in the table whether the brake is adjusted.

* * * * *